US 011725515B2

United States Patent
Anderson et al.

(10) Patent No.: US 11,725,515 B2
(45) Date of Patent: Aug. 15, 2023

(54) ROTARY ENGINE WITH RECIRCULATING ARC ROLLER POWER TRANSFER

(71) Applicant: Lumenium LLC, Fredericksburg, VA (US)

(72) Inventors: William Anderson, Fredericksburg, VA (US); William Lukaczyk, Fredericksburg, VA (US)

(73) Assignee: Lumenium LLC, Fredericksburg, VA (US)

( * ) Notice: Subject to any disclaimer, the term of this patent is extended or adjusted under 35 U.S.C. 154(b) by 0 days.

(21) Appl. No.: 17/828,348

(22) Filed: May 31, 2022

(65) Prior Publication Data
US 2022/0290565 A1    Sep. 15, 2022

Related U.S. Application Data

(63) Continuation of application No. 17/012,342, filed on Sep. 4, 2020, now abandoned, which is a continuation
(Continued)

(51) Int. Cl.
*F01C 21/00* (2006.01)
*F16J 1/14* (2006.01)
(Continued)

(52) U.S. Cl.
CPC .............. *F01C 1/22* (2013.01); *F01C 21/008* (2013.01); *F02B 53/14* (2013.01); *F02B 55/02* (2013.01);
(Continued)

(58) Field of Classification Search
CPC .. F01C 1/22; F01C 21/008; F01C 1/32; F01C 21/10; F01C 21/0836; F01C 1/44;
(Continued)

(56) References Cited

U.S. PATENT DOCUMENTS

| 396,176 A | 1/1889 | Simpson |
| 613,345 A | 11/1898 | White |

(Continued)

FOREIGN PATENT DOCUMENTS

| CN | 102207006 A | 10/2011 |
| CN | 104066931 A | 9/2014 |

(Continued)

OTHER PUBLICATIONS

USPTO Non-Final Office Action issued in related U.S. Appl. No. 13/868,359, filed Jul. 26, 2013.
(Continued)

*Primary Examiner* — J. Todd Newton
(74) *Attorney, Agent, or Firm* — DeWitt LLP; Brian R. Pollack, Esq.

(57) ABSTRACT

The disclosure provides rotary machines that include, in one embodiment, a shaft defining a central axis A, the shaft having a first end and a second end. The shaft can have a first gearbox disposed thereon defining one or more cavities therein. At least one contour is slidably received into an arcuate cavity in an exterior surface of the gearbox. The contour has a convex outer surface that cooperates with an inwardly facing curved surface of a housing to form a working volume. A gearbox mechanism consisting of gears, crankshafts, bearings and connecting rod creates an oscillatory motion 2 times per revolution such that the contour can navigate about the arcuate cavity without contacting the cavity at a high rate of rotating speed. Thus, said working volume can expand and compresses twice per rotatable shaft revolution.

7 Claims, 7 Drawing Sheets

Related U.S. Application Data of application No. PCT/US2019/063762, filed on Nov. 27, 2019.

(60) Provisional application No. 62/771,961, filed on Nov. 27, 2018.

(51) Int. Cl.

| | | |
|---|---|---|
| *F16H 1/28* | (2006.01) | |
| *F01C 1/32* | (2006.01) | |
| *F01C 1/22* | (2006.01) | |
| *F02B 53/14* | (2006.01) | |
| *F02B 55/02* | (2006.01) | |
| *F02B 55/08* | (2006.01) | |
| *F16H 57/02* | (2012.01) | |
| *F16H 57/04* | (2010.01) | |
| *F01C 21/10* | (2006.01) | |
| *F02B 53/10* | (2006.01) | |

(52) U.S. Cl.
CPC ............ *F02B 55/08* (2013.01); *F16H 57/02* (2013.01); *F16H 57/0454* (2013.01); *F16J 1/14* (2013.01); *F01C 1/32* (2013.01); *F01C 21/10* (2013.01); *F02B 53/10* (2013.01); *F02B 2730/011* (2013.01); *F16H 1/28* (2013.01); *F16H 2057/0203* (2013.01); *F16H 2057/02039* (2013.01)

(58) Field of Classification Search
CPC .......... F02B 53/14; F02B 55/02; F02B 55/08; F02B 53/10; F02B 2730/011; F02B 53/02; F16H 57/02; F16H 57/0454; F16H 1/28; F16H 2057/0203; F16H 2057/02039
See application file for complete search history.

(56) References Cited

U.S. PATENT DOCUMENTS

| | | | |
|---|---|---|---|
| 777,692 A | 12/1904 | Phifer | |
| 1,970,004 A | 8/1934 | Freidell | |
| 2,277,225 A | 3/1942 | Green | |
| 2,919,062 A | 12/1959 | Tryhom | |
| 3,108,579 A * | 10/1963 | Korf | F02B 55/00 |
| | | | 418/242 |
| 3,186,385 A | 6/1965 | Walker | |
| 3,187,507 A | 6/1965 | Artajo | |
| 3,245,389 A | 4/1966 | Korf | |
| 3,259,113 A | 7/1966 | Hamada | |
| 3,289,654 A | 12/1966 | Geiger | |
| 3,295,505 A | 1/1967 | Jordan | |
| 3,302,870 A | 2/1967 | Schell | |
| 3,405,692 A | 10/1968 | Paschke | |
| 3,563,680 A * | 2/1971 | Jehle | F01C 1/40 |
| | | | 418/265 |
| 3,636,930 A | 1/1972 | Okada | |
| 3,855,977 A | 12/1974 | Statkus | |
| 3,884,600 A | 5/1975 | Gray | |
| 3,936,250 A | 2/1976 | Mrlik | |
| 3,981,645 A | 9/1976 | Herzner | |
| 4,055,156 A | 10/1977 | Salguero | |
| 4,144,866 A | 3/1979 | Hakner | |
| 4,850,447 A | 7/1989 | Hirakushi | |
| 5,380,177 A | 1/1995 | Leroy et al. | |
| 5,494,014 A | 2/1996 | Lobb | |
| 5,540,199 A | 7/1996 | Penn | |
| 5,681,157 A | 10/1997 | Wen-Ming | |
| 6,120,272 A | 9/2000 | Gillardo | |
| 6,129,068 A | 10/2000 | Wingate, Jr. | |
| 6,758,188 B2 | 7/2004 | Woolridge | |
| 7,051,698 B2 | 5/2006 | Ollis | |
| 7,621,255 B2 | 11/2009 | Bowley | |
| 8,733,317 B2 | 5/2014 | Herbruck | |
| 9,376,914 B2 | 6/2016 | Vading | |
| 10,184,392 B2 * | 1/2019 | Lukaczyk | F02B 55/02 |
| 2003/0188711 A1 | 10/2003 | Chou | |
| 2004/0011320 A1 | 1/2004 | Woolridge | |
| 2006/0210419 A1 | 9/2006 | Chadwick, II | |
| 2010/0242897 A1 | 9/2010 | Woolridge | |
| 2012/0031369 A1 | 2/2012 | Ki | |
| 2016/0298536 A1 * | 10/2016 | Lukaczyk | F02B 53/10 |
| 2019/0226395 A1 * | 7/2019 | Lukaczyk | F02B 55/08 |

FOREIGN PATENT DOCUMENTS

| | | |
|---|---|---|
| DE | 2047732 A1 | 3/1972 |
| DE | 2853930 A1 | 6/1980 |
| DE | 3236811 A1 | 5/1984 |
| EP | 1092838 A1 | 4/2001 |
| EP | 1534943 | 1/2004 |
| FR | 1446480 A | 6/1966 |
| FR | 2234460 A1 | 1/1975 |
| FR | 2250892 A1 | 6/1975 |
| GB | 1454329 A | 11/1976 |
| IN | 255824 A1 | 3/2013 |
| JP | 47-16570 | 5/1972 |
| JP | 56-18772 B1 | 5/1981 |
| JP | 61-210228 A | 9/1986 |
| JP | 63-065665 A | 3/1988 |
| JP | 06-329675 A | 11/1994 |
| JP | 2002-188454 A | 7/2002 |
| JP | 4763829 B2 | 8/2011 |
| RU | 2158834 C1 | 11/2000 |
| RU | 2293848 C2 | 2/2007 |
| WO | 2002/052125 A1 | 7/2002 |
| WO | 2004/007926 A1 | 1/2004 |
| WO | 2004070169 A1 | 8/2004 |
| WO | 2010/111557 A2 | 9/2010 |
| WO | 2010/128776 A2 | 11/2010 |
| WO | 2016168320 A1 | 10/2016 |
| WO | 2020113109 A1 | 6/2020 |

OTHER PUBLICATIONS

USPTO Final Office Action issued in related U.S. Appl. No. 13/868,359, filed Dec. 16, 2013.
International Search Report in related international application No. PCT/US2003/014906, dated Aug. 7, 2003.
International Preliminary Examination Report in related international application No. PCT/US2003/014906.
Supplementary European Search Report in related European application No. 03731157, completed Jul. 6, 2009.
Decision of Refusal in related JP patent application No. 2004-521437, dated Aug. 25, 2009.
European Communication pursuant to Article 94(3) EPC in related EP patent application No. EP 03731157.8, dated Oct. 21, 2009.
Notice of Office Action in related Korean application No. 7021723/2004, transmitted May 11, 2010.
First Examination Report in related Indian patent application 2959/CHENP/2004 (IN Patent No. 255824), dated Jan. 23, 2012.
International Search Report in related international application No. PCT/US2010/028754, dated Mar. 26, 2012.
International Preliminary Report on Patentability and Written Opinion in related international application No. PCT/US2010/028754, dated Apr. 17, 2012.
USPTO Non-Final Office Action issued in related U.S. Appl. No. 12/732,160, filed Nov. 23, 2012.
USPTO Final Office Action issued in related U.S. Appl. No. 12/732,160, dated Mar. 27, 2013.
Notice of Reasons for Rejection in related JP patent application No. 2004-521437, Dec. 2, 2008.
International Preliminary Report on Patentability in related international application No. PCT/US2013/030649, dated Sep. 16, 2014.
Written Opinion of the International Searching Authority in related international application No. PCT/US2013/030649, dated Aug. 15, 2013.
EPO. Extended European Search Report for related European Patent Application No. 16780640.5, dated Nov. 9, 2018, 8 pages.

(56) References Cited

OTHER PUBLICATIONS

International Search Report and Written Opinion in International Application No. PCT/US2016/027317, dated Aug. 18, 2016.
English translation of Office Action dated Mar. 18, 2020 in Chinese counterpart application No. 201680034430.2.
International Search Report dated Feb. 27, 2020 in International Application No. PCT/US2019/063762.
Written Opinion of the International Searching Authority dated Feb. 27, 2020 in International Application No. PCT/US2019/063762.
International Search Report for PCT/US 2021/032831, dated Aug. 10, 2021.
Written Opinion of the International Searching Authority for PCT/US 2021/032831, dated Aug. 10, 2021.
CNIPA. Search Report dated Mar. 26, 2019, for related Chinese Patent Application No. 201680034430.2, 4 pages.

\* cited by examiner

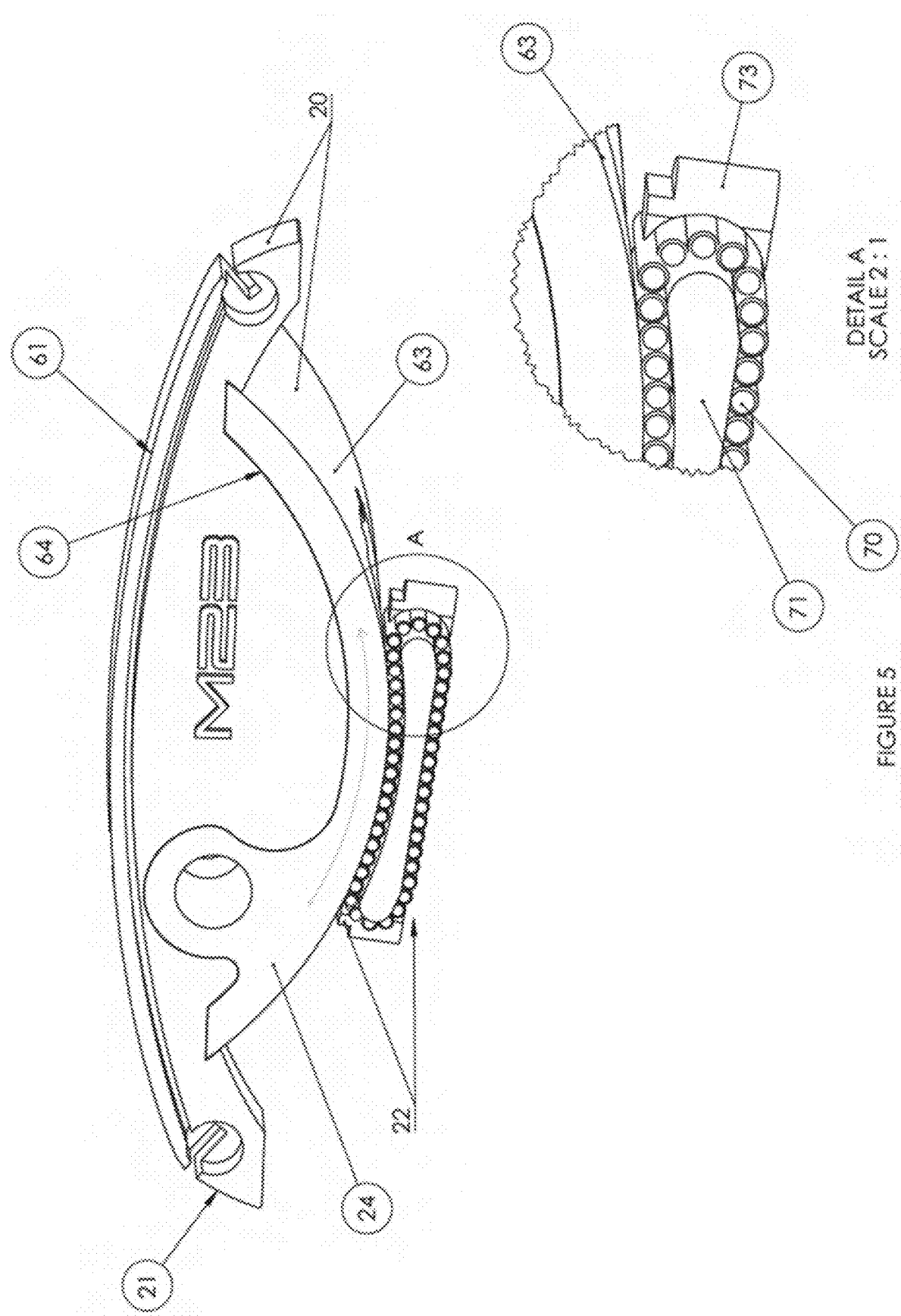

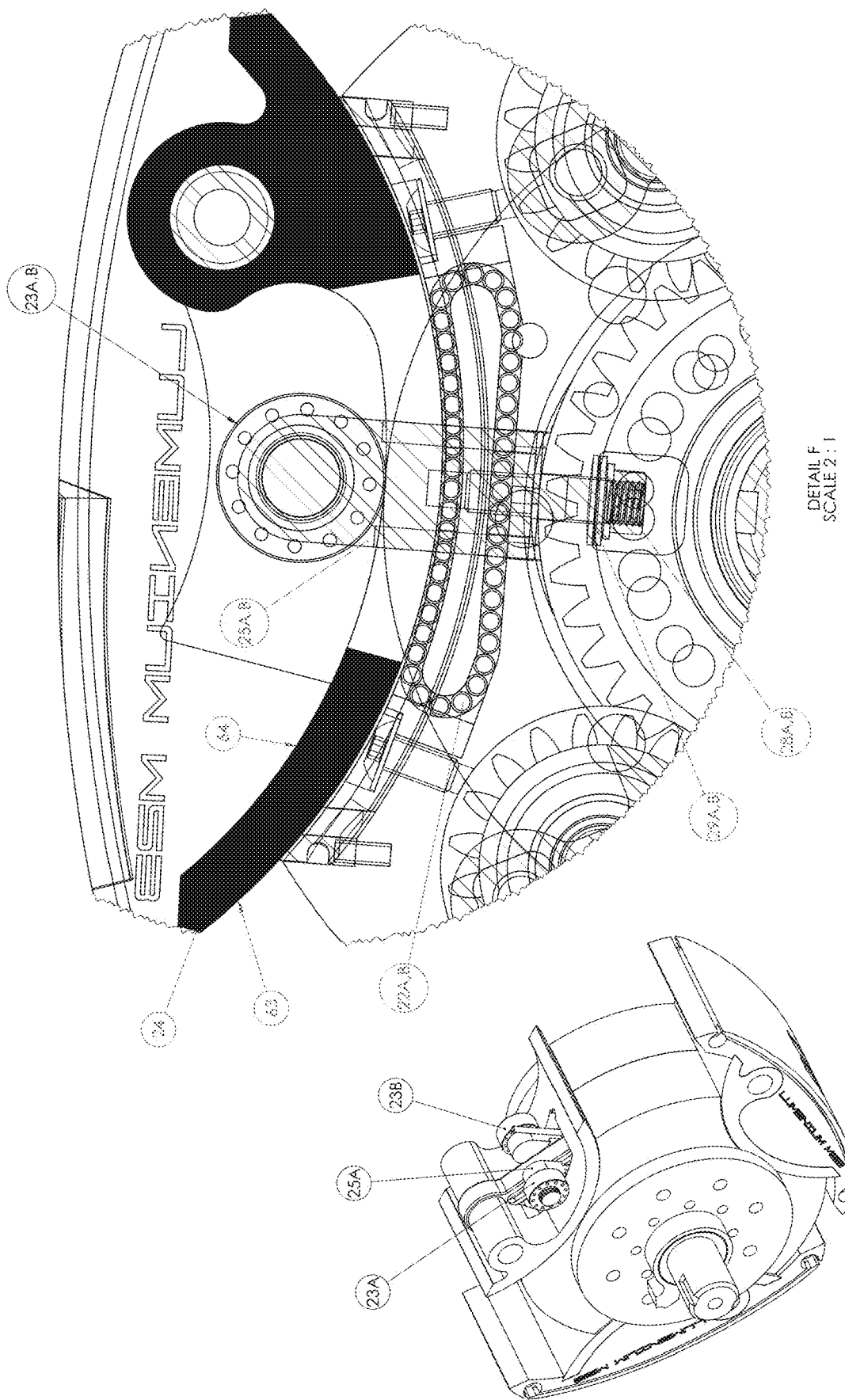

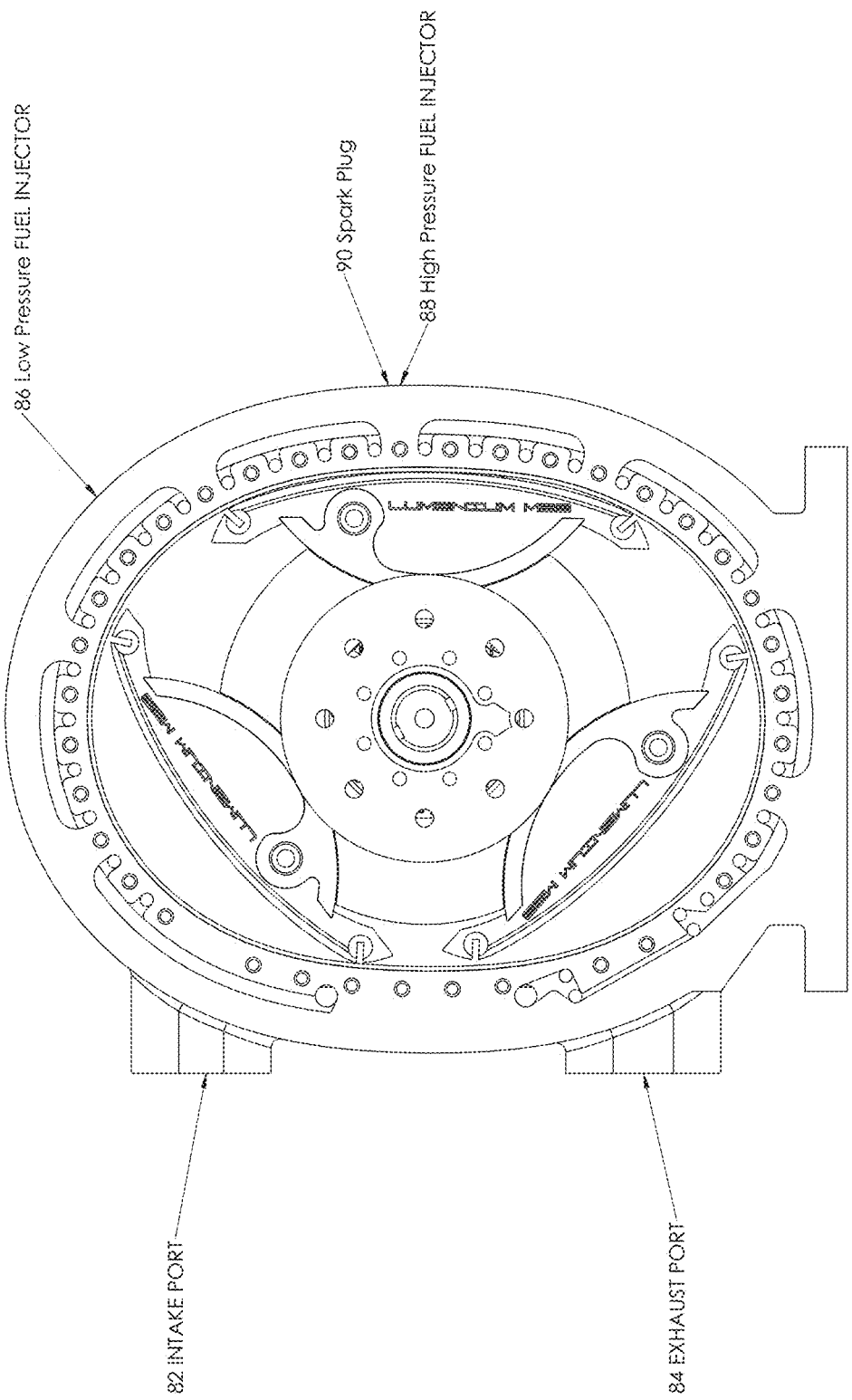

ROTARY ENGINE WITH RECIRCULATING ARC ROLLER POWER TRANSFER

CROSS-REFERENCE TO RELATED APPLICATIONS

This patent application is a continuation of and claims the benefit of priority to U.S. patent application Ser. No. 17/012,342, filed Sep. 4, 2020, which in turn is a continuation of and claims the benefit of priority to International Patent Application No. PCT/US2019/063762, filed Nov. 27, 2019, which claims the benefit of priority to U.S. Provisional Application Ser. No. 62/771,961, filed Nov. 27, 2018. This patent application is also related to Patent Application No. PCT/US16/027317, filed Apr. 13, 2016, which in turn claims the benefit of priority to U.S. Provisional Patent Application Ser. No. 62/146,958, filed Apr. 13, 2015. This patent application is also related to Patent Application No. PCT/US14/56383, filed Sep. 18, 2014, which in turn claims the benefit of priority to U.S. Provisional Patent Application Ser. No. 61/879,628, filed Sep. 18, 2013. This patent application is also related to International Patent Application No. PCT/US13/30649, filed Mar. 13, 2013, which in turn claims the benefit of priority to U.S. Provisional Patent Application Ser. No. 61/697,481, filed Sep. 6, 2012, and U.S. Provisional Patent Application Ser. No. 61/610,781, filed Mar. 14, 2012. Each of the aforementioned patent applications is incorporated by reference herein in its entirety for any purpose whatsoever.

BACKGROUND

U.S. Pat. No. 6,758,188, entitled "Continuous Torque Inverse Displacement Asymmetric Rotary Engine", the disclosure of which is incorporated herein by reference in its entirety, discloses an Inverse Displacement Asymmetric Rotary (IDAR) engine. The engine includes an inner chamber wall, an outer chamber wall, and a movable contour. U.S. patent application Ser. No. 12/732,160, filed Mar. 25, 2010, which is also incorporated by reference herein in its entirety, presents improved embodiments vis-à-vis the embodiments of U.S. Pat. No. 6,758,188. The present disclosure provides significant improvements over these embodiments, as described herein.

SUMMARY

The disclosed embodiments improve upon and add to embodiments described in the patents and patent applications referenced above.

In some implementations, the disclosure provides a rotary machine to combust an air-fuel mixture that releases chemical energy and produces usable work at a rotating shaft. The rotary machine can include a fixed housing with an oval like shape (or other suitable shape), and a central or main shaft. The machine can provide for one, two, three, or more, combustion events per revolution in a very compact space.

In some implementations, the disclosure provides a rotary machine that has a central gearbox transmission that forcibly articulates the cyclical motion needed for a contour to circumnavigate through a stationary oval like center section without touching the interior surface of the stationary center section.

In some implementations, the disclosure provides a rotary machine that uses a combination of one or more stationary driver gears and orbiting driven gears and crank shafts with connecting rods to forcibly articulate the necessary cyclical arc motion for a contour to travel within a stationary center housing without touching the interior curved surface.

In some implementations, the disclosure provides a rotary machine having a revolving gearbox within a stationary oval like housing that contains bearings that support the arcing motion of contour assemblies.

In some implementations, the disclosure provides a rotary machine having a stationary oval-like housing that contains arced seals to prevent the transfer of fluids or gasses between the gap of the relative moving surfaces of the gearbox and adjacent contour.

In some implementations, the disclosure provides a rotary machine including a revolving gearbox containing a multiplicity of arced roller ways that support the hard cylindrical underside of a contour moving in an arc like direction about an imaginary axis.

In some implementations, the disclosure provides a rotary machine that includes a housing defining an inwardly facing continuously curved surface, front and rear side plates attached to the housing, and a central shaft defining a central axis A, the shaft having a first end and a second end. The rotary machine can further include a first gearbox disposed on the central shaft. The first gearbox can have a body with a volume generally defined between front and rear surfaces that are spaced apart along the central shaft, at least a portion of the first gearbox being situated axially between the front and rear side plates. The rotary machine can further include at least one contour assembly coupled to the first gearbox. The at least one contour assembly can be defined at least in part by a convex radially outwardly facing surface, the convex radially outwardly facing surface of the at least one contour assembly, front and rear side plates and the inwardly facing continuous curved surface of the housing cooperating to form at least one working volume that changes in volume as the central shaft rotates about the central axis A.

In some implementations, the at least one contour assembly can be coupled to the first gearbox by way of a connecting rod. A radially inward end of the connecting rod can be pivotally coupled to the gearbox, and a radially outward end of the connecting rod can be pivotally coupled to the at least one contour assembly. If desired, the radially inward end of the connecting rod can be pivotally coupled to a crank pin. The crank pin can be defined on a crankshaft that is distinct from the central shaft. The crankshaft can have a center of rotation that is disposed radially outwardly with respect to the central shaft. The crankshaft can include gear teeth that mesh with a central gear that surrounds the central shaft. The central gear can be stationary with respect to the housing.

In various embodiments, the rotary machine can be configured to forcibly articulate cyclical motion to cause at least one contour assembly to circumnavigate through a constrained orbit while maintaining a predetermined spacing between the convex radially outwardly facing surface of the contour assembly and the inwardly facing continuously curved surface of the housing.

If desired, rotary machines can be provided wherein the central shaft can be coupled to the first gearbox and the central shaft and first gearbox can rotate as a single unit.

The disclosure further provides implementations of a rotary machine that includes a housing defining an inwardly facing continuously curved surface, front and rear side plates attached to the housing, a central shaft defining a central axis A, the shaft having a first end and a second end, first hub disposed on the central shaft, the first hub having a body with a volume generally defined between front and rear surfaces that are spaced apart along the central shaft. The perimeters of the front and rear surfaces can define at least one radially outwardly facing concavity through the first hub. At least a portion of the first hub can be situated axially between the front and rear side plates. The rotary machine can further include at least one arced seal disposed along the radially outwardly facing concavity through the first hub. If desired, the machine can further include at least one contour assembly at least partially slidably disposed on the at least one arced seal disposed along the at least one radially outwardly facing concavity defined on the first hub. The at least one contour assembly can be defined at least in part by a convex radially inwardly facing surface and a convex radially outwardly facing surface. The convex radially inwardly facing surface of the at least one contour assembly can be configured to slide along the at least one radially outwardly facing concavity of the first hub along the at least one arced seal. The at least one arced seal can act to prevent the transfer of fluids through a gap defined between the radially outwardly facing concavity of the first hub and the convex radially inwardly facing surface of the at least one contour assembly. If desired, the first hub and the at least one contour assembly can be mechanically coupled by a connecting rod.

The disclosure further provides implementations of a rotary machine that includes a housing defining an inwardly facing continuously curved surface, front and rear side plates attached to the housing, and a central shaft defining a central axis A, the shaft having a first end and a second end. The rotary machine can further include a first hub disposed on the central shaft, the first hub having a body with a volume generally defined between front and rear surfaces that are spaced apart along the central shaft. The perimeters of the front and rear surfaces can define at least one radially outwardly facing concavity through the first hub. At least a portion of the first hub can be situated axially between the front and rear side plates. The rotary machine can further include at least one contour assembly at least partially slidably disposed on the at least one radially outwardly facing concavity defined on the first hub. The at least one contour assembly can be defined at least in part by a convex radially inwardly facing surface and a convex radially outwardly facing surface. The convex radially inwardly facing surface of the at least one contour assembly can face the at least one radially outwardly facing concavity of the first hub. The convex radially outwardly facing surface of the at least one contour assembly, front and rear side plates and the inwardly facing continuous curved surface of the housing can cooperate to form at least one working volume that changes in volume as the central shaft rotates about the central axis A. The rotary machine can further include a guide coupled to the first hub that extends into the at least one contour assembly. The guide can be configured to prevent radial outward movement of the at least contour assembly with respect to the first hub.

In some implementations, the guide can include at least one yoke roller rotatably coupled to a link that is in turn coupled to the first hub. The at least one yoke roller can define an outer surface that is in rolling mechanical contact with a roller track defined along a further radially outwardly facing surface of the at least one contour assembly. If desired, the link can include a bracket having a radially outward end coupled to the at least one yoke roller, and a radially inward end coupled to a portion of the first hub. The link can be configured to preload a radially inward force onto the at least one contour assembly to maintain mechanical contact between the at least one contour assembly and the first hub. If desired, the preload can be achieved at least in part by way of a compression spring, and/or an elastically deformable washer, for example. The link can be adjustable in length. At least one of the convex radially inwardly facing surface of the at least one contour assembly and the at least one radially outwardly facing concavity of the first hub can include at least one roller bearing for contacting the other surface of the at least one of the convex radially inwardly facing surface of the at least one contour assembly and the at least one radially outwardly facing concavity of the first hub. If desired, the rotary machine can further include a connecting rod that couples the first hub to the at least one contour assembly, wherein the connecting rod is distinct from the guide.

The disclosure further includes a rotary machine having a housing defining an inwardly facing continuously curved surface, front and rear side plates attached to the housing, a central shaft defining a central axis A, the shaft having a first end and a second end, and a first hub disposed on the central shaft. The first hub can have a body with a volume generally defined between front and rear surfaces that are spaced apart along the central shaft. The perimeters of the front and rear surfaces can define at least one radially outwardly facing concavity through the first hub. At least a portion of the first hub can be situated axially between the front and rear side plates. The rotary machine further includes at least one contour assembly at least partially slidably disposed on the at least one radially outwardly facing concavity defined on the first hub. The at least one contour assembly can be defined at least in part by a convex radially inwardly facing surface and a convex radially outwardly facing surface, the convex radially inwardly facing surface of the at least one contour assembly facing the at least one radially outwardly facing concavity of the first hub. The convex radially outwardly facing surface of the at least one contour assembly, front and rear side plates and the inwardly facing continuous curved surface of the housing can cooperate to form at least one working volume that changes in volume as the central shaft rotates about the central axis A, wherein the rotary machine is configured to forcibly articulate cyclical motion to cause the at least one contour assembly to circumnavigate through a constrained orbit while maintaining a predetermined spacing between the convex radially outwardly facing surface of the contour assembly and the inwardly facing continuously curved surface of the housing.

The disclosure further provides embodiments of a rotary machine having a housing defining an inwardly facing continuously curved surface, front and rear side plates attached to the housing component, and a first hub configured to rotate about a central axis A. The first hub can have a body with a volume at least partially defined between front and rear surfaces that are spaced apart along the central axis A. The perimeters of the front and rear surfaces can define at least one radially outwardly facing concavity through the first hub. At least a portion of the first hub can be situated axially between the front and rear side plates. The first hub can include at least one further crankshaft that includes a gear that in turn meshes with a central gear.

In some implementations, the central gear can be stationary with respect to the housing. The first hub can define at least one fluidly sealed internal cavity therein for containing and circulating lubricants therethrough.

The disclosure further provides a rotary machine having a housing defining an inwardly facing continuously curved surface, front and rear side plates attached to the housing, a central shaft defining a central axis A, the shaft having a first end and a second end. The rotary machine further includes a first hub disposed on the central shaft. The first hub has a body with a volume generally defined between front and rear surfaces that are spaced apart along the central shaft. The perimeters of the front and rear surfaces can define at least one radially outwardly facing concavity through the first hub. The first hub can be situated axially between the front and rear side plates. The rotary machine can further include at least one bearing race disposed along the radially outwardly facing concavity through the first hub, and at least one contour assembly at least partially slidably disposed on the at least one bearing race disposed along the at least one radially outwardly facing concavity defined on the first hub. The at least one contour assembly can be defined at least in part by a convex radially inwardly facing surface and a convex radially outwardly facing surface. The convex radially inwardly facing surface of the at least one contour assembly can be configured to slide along the at least one bearing race.

In some implementations, the device can further include combustion contour components which have the side opposite the combustion chamber in a convex (e.g., cylindrical) surface. The contours are in close proximity to a central rotatable Gear Box attached to the central or main shaft which is rotated. Two large bearings (e.g., either ball, roller or oil film, for example) are provided to support the rotating main shaft including the gear box and contours. Reciprocation of the contours can be guided by rollers or pads, lubricated by an oil film, that contact the underside of the contour and are supported by the gearbox. Power transfer is realized from the combusting a fuel-air mixture in the working volume and imparting pressure on the contour. The contour then imparts a force on the supporting rollers, balls or pads into the gear box structure which is bonded to the main shaft. Then rotary power is received directly from the main shaft. The combustion cycle can be either spark ignited ("SI") or compression ignited ("CI").

Induction and exhaust can be achieved through ports without valves on the fixed housing. Auxiliary chambers can be provided to prevent cross contamination of adjacent working volumes. Lower friction and better working volume sealing can be achieved by using wheels with "frictionless" bearings and cam profiles to control the motion of contours.

The disclosure further provides improved systems for creating the controlled reciprocation motion with the use of gears, chains, belts, crankshafts, and connecting rods. Oil for fluid cooling and lubrication can be provided for temperature regulation of the rotary machine, and rotary fluid couplings can be provided to allow the fluid to enter and exit the gearbox. Moreover, improved geometries are provided for mitigating oil consumption.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the methods and systems of the disclosure. Together with the description, the drawings serve to explain the principles of the disclosed embodiments.

BRIEF DESCRIPTION OF DRAWINGS

Accompanying the description are plural images illustrating the disclosed embodiments, which represent non-limiting, examples and in which:

FIG. 5 is an isometric view of an illustrative contour showing its placement relative to a linear bearing that transmits motion of the contour to the hub.

FIG. 6 is a cut-away view of the yoke roller that retains the contour.

FIG. 7 is a view of a front face of the engine illustrating a contour at top dead center in the device.

DETAILED DESCRIPTION OF THE DISCLOSED EMBODIMENTS

Figure 1:
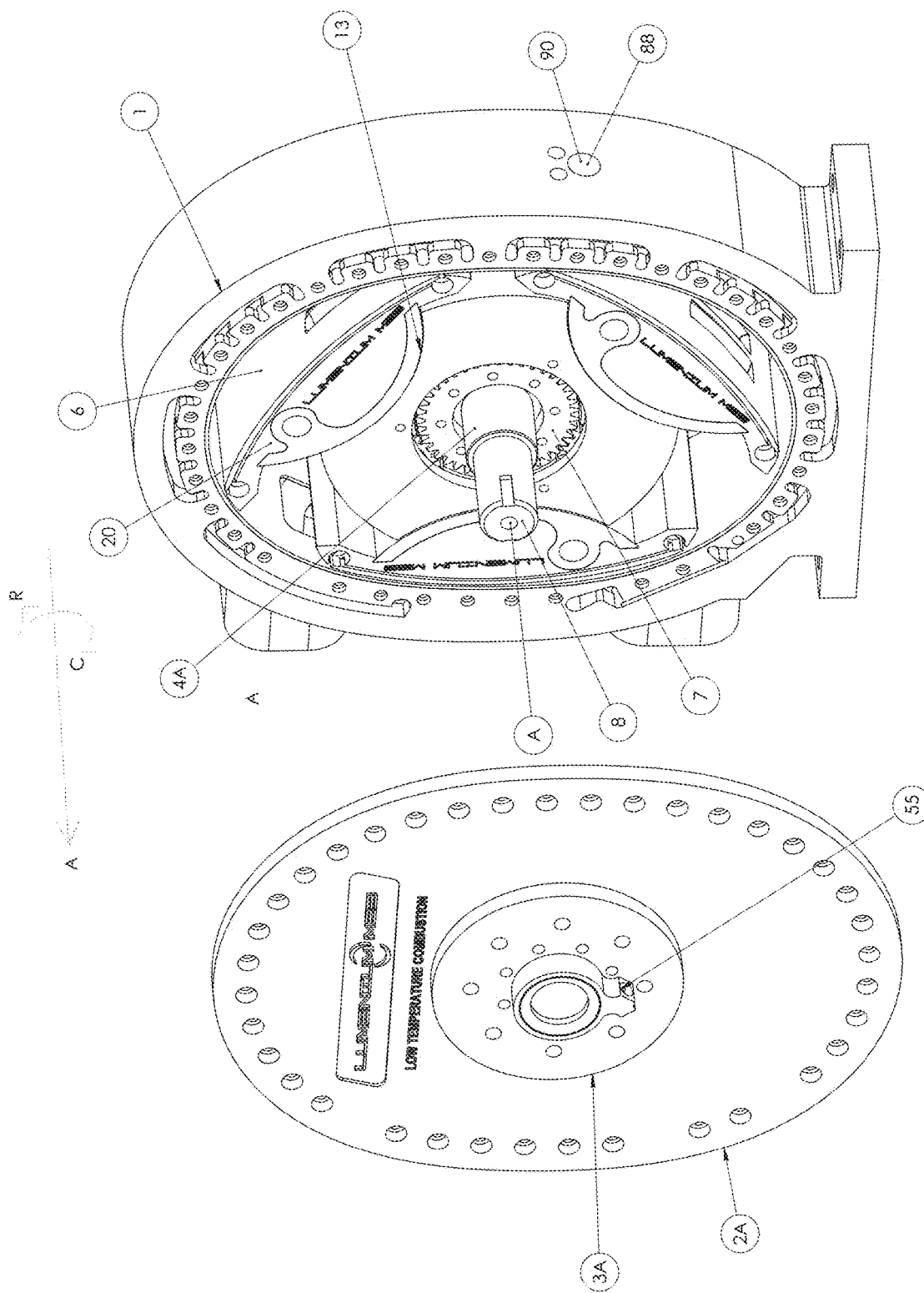
FIG. 1 is an isometric view of an embodiment of a rotary machine in accordance with the disclosure showing a cover plate removed from the engine, depicting an inner face of the cover plate and an isometric view of the engine components.

Referring to FIG. 1, components are illustrated which form an illustrative implementation in accordance with the present disclosure. In addition, a coordinate system is illustrated which will be utilized for discussing the disclosed embodiments. This coordinate system is a cylindrical, three dimensional system, consisting of axial (A), radial (R) and circumferential (C) axes.

As illustrated in FIG. 1, a fixed housing center section 1 has fixed thickness and its interior represents one of the internal surfaces of the working volume. As illustrated, the center section 1 includes an annular, oval shaped housing that is defined by a peripheral, annular wall having a generally oval projection when viewed from either end. The annular wall defines an inner surface that cooperates with side plates of the housing and an outwardly facing surface of each contour assembly to define a working volume, described in further detail below. This Center Section 1, is held by subsequent sections that are bolted to it. Any such sections can have mounting features, such as flanges and the like to affix the machine to a supporting structure. For the example shown in FIG. 1 or 5, the mountings are the lower flange.

Figure 4:
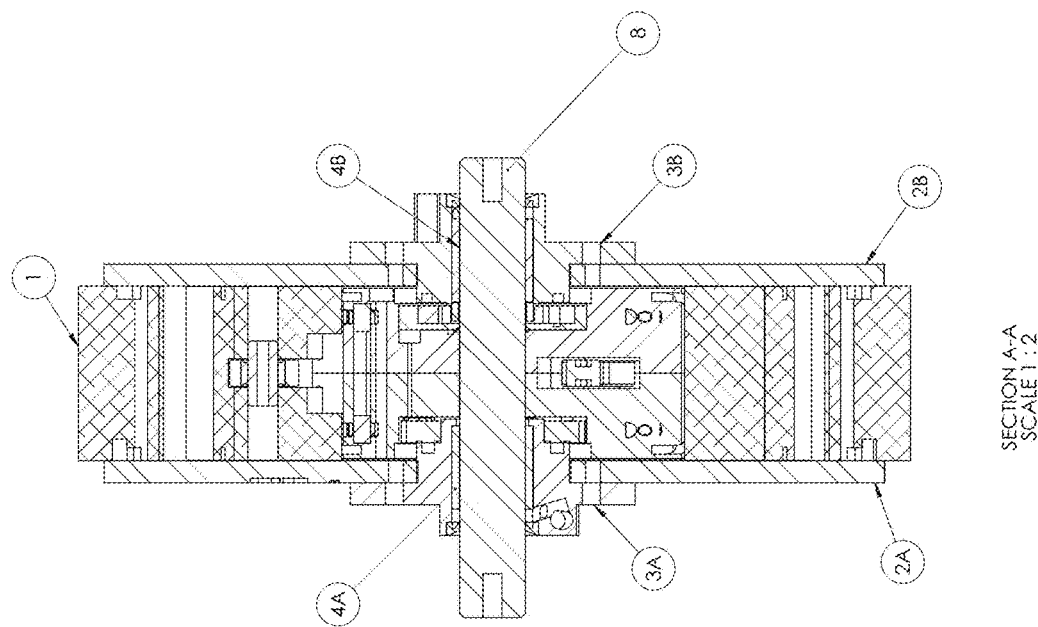
FIG. 4 shows a cut-away end view of the embodiment of FIG. 1 illustrating the relative placement of different components.
Figure 4:
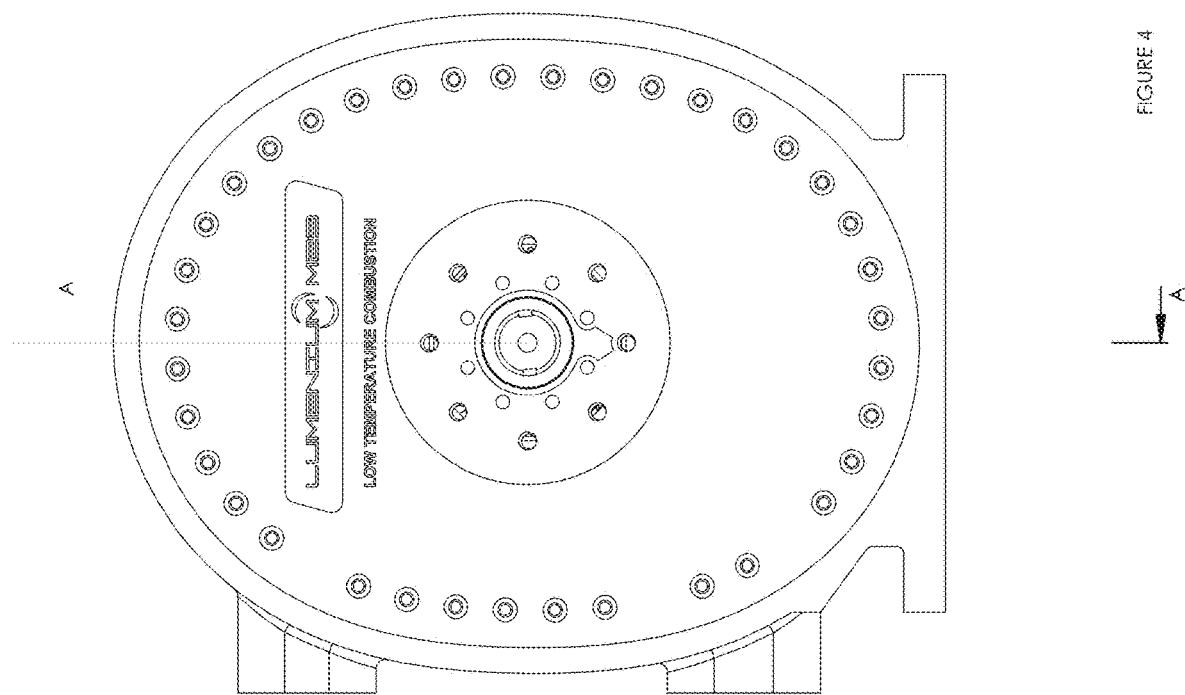

Working out from the center of the device, the stationary center section 1 as shown in FIGS. 1 and 4, has two flat, parallel peripheral faces of a generally oval annular shape that are in turn detachably mated to two separate front 2A and rear 2B side plates. The mechanical interface of the parts, has features (e.g., seals and the like) that make the joint gas tight. Side plates 2A and 2B help define part of the working volume's 6, internal surfaces. Next attached to the side plates 2A and 2B are bearing supports Front 3A and Rear 3B. The bearing support holds either oil film, roller, needle or ball bearings and the like that support the main shaft 8. Bearing supports 3A and 3B have smooth outer surfaces such that a composite oil seal can contact it and keep oil from leaking between the stationary and rotating parts. Lastly, a stationary gear 7, is attached to the inward facing end of the bearing support 3A such as via bolts or a spline that are directed through aligned holes in the gear 7 and the support 3a and juts into the gear box 9. This completes the stationary portions of the device.

Figure 2:
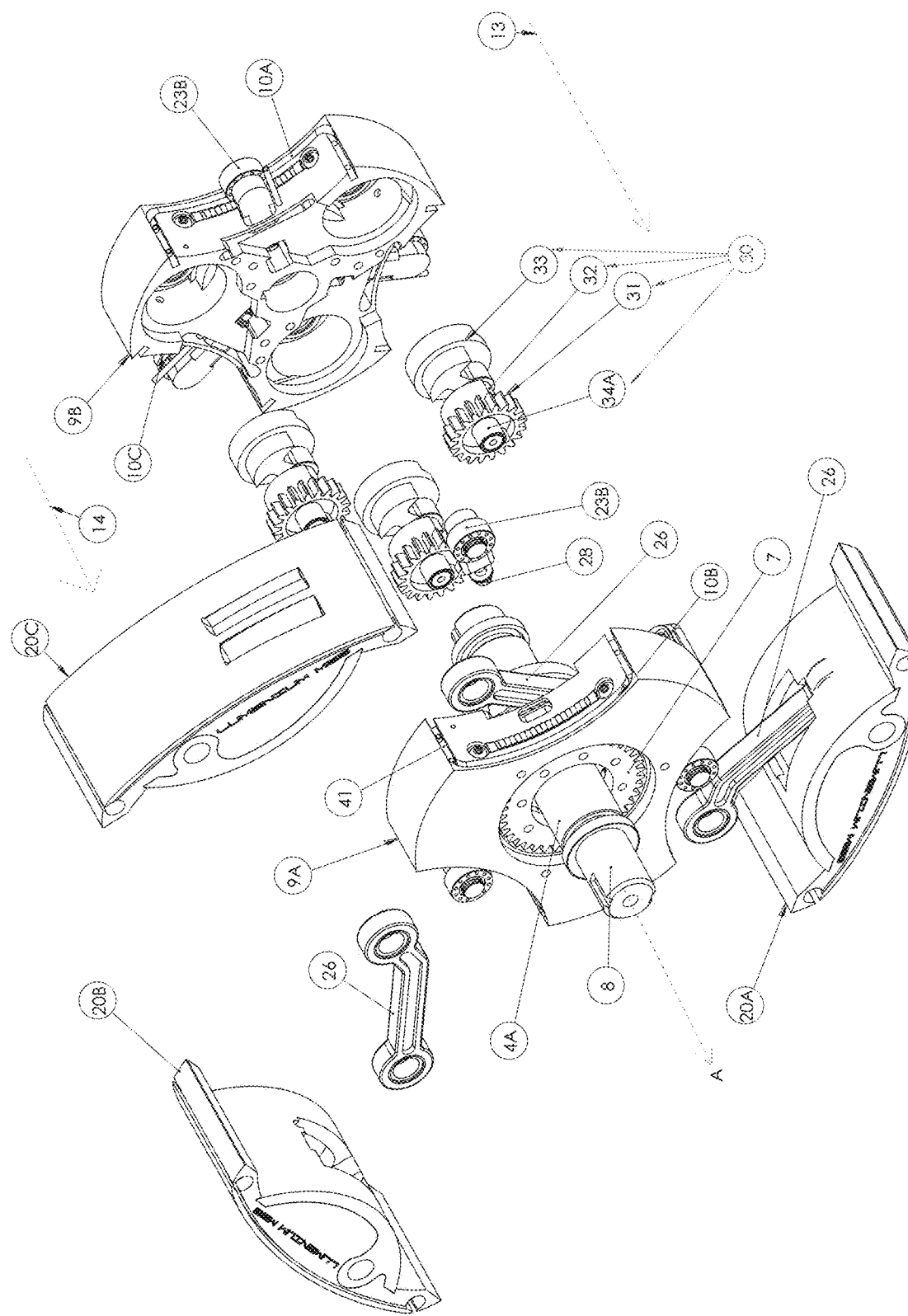
FIG. 2 is an isometric exploded view of an internal hub and gearbox assembly of the embodiment of FIG. 1 illustrating front and rear portions of the hub, as well as contours, connecting rods and associated hardware components.

FIG. 2, shows an exploded view of the rotating parts of the device. The main shaft 8 is supported by the bearings of the roller, ball or oil film type 4A and 4B. Said bearings support rotatable shaft 8.

Rotatable shaft 8 has mounted on it in a fixed angular displacement central gear box 9 that rotates on the same axis "A" as the shaft 8 as shown in FIG. 1. Gearbox 9, is approximately the same or slightly less than the thickness (along the length of shaft 8) of center section 1. Gearbox, 9 is shown as having two matable housing portions 9A and 9B to allow assembly and for rotatably supporting components within the gearbox 9. However, gearbox 9 could be a single main unit with access ports instead of two halves. Gearbox 9 is disposed between side plates 2A and 2B as shown in FIGS. 1 and 4. FIG. 2 illustrates how gearbox 9 has an outer peripheral surface defined in part by a plurality of concave arced surfaces 10A, 10B, 10C that are in turn separated by three peripheral convex surfaces. While three concave surfaces are illustrated, any suitable number of such surfaces can be provided, depending on the design of the engine. For example, one, two, three, four, five or more such surfaces can be provided, wherein each such surface has corresponding mechanical components as discussed herein below. Each arced surface is illustrated as being a curved plane having an arcuate projection along the direction of axis A.

As illustrated, a line in three dimensional space, 13, is illustrated that is disposed radially outwardly from the central axis of shaft 8 (along the direction of axis A), and is parallel to shaft 8. The center of each arced segment is disposed radially outwardly with respect to the central axis of the shaft 8, such that a line connecting the central axis of the shaft and the center of arced segment is oriented along a radial direction (along the direction of axis R, assuming that the axis A were coincident with the central axis of the shaft 8). To put it another way, a line drawn from the center of curvature of each arced surface 10A, 10B, 10C that passes to the center of shaft 8 along direction R directly intersects the center of each arced surface, so that the arced surface effectively points out along the direction of axis R in a symmetric manner.

The concave arcuate surfaces of gearbox 9, are approximately extruded in the A axis direction to form an incomplete cylindrical surfaces 10 A, B, C of FIG. 2. The center of these cylinders is shown as respectively lines 13. The surfaces 10 may have features which allow a load bearing, sliding surface, provide oil feed and retention, compensate for thermal expansion and contraction, provide for high load durable wear surface and limit the flow of gases.

Figure 3:
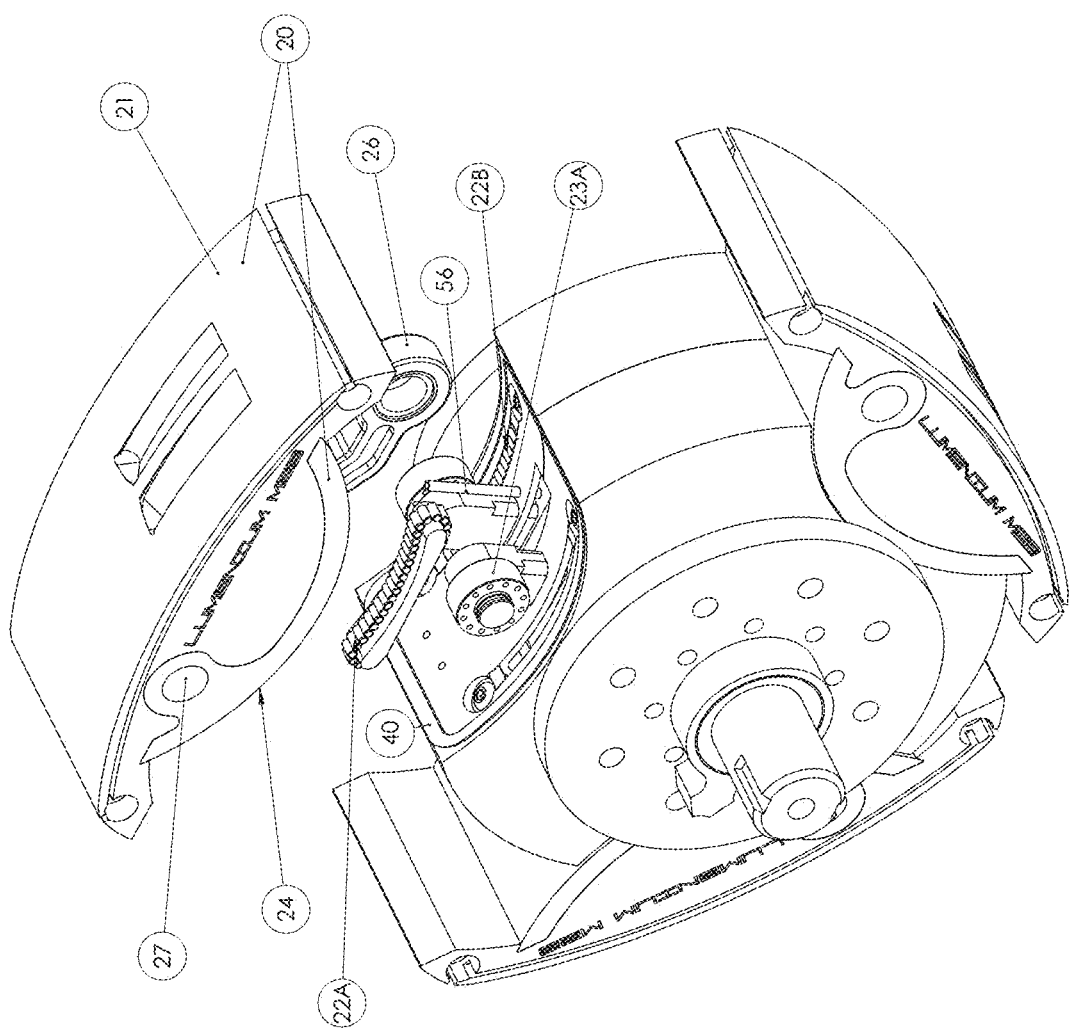
FIG. 3 is an isometric view of a rotating Gearbox assembly of the embodiment of FIG. 1 showing one contour removed from the assembly and showing an associated linear bearing that transmits force from the contour to the hub.

This embodiment shows three contour assemblies 20A, B, C. They are illustrated as being identical. Three contour assemblies 20 (also referred to herein as "contours"), are shown in FIG. 3. Each one includes a contour upper body 21 having an outer convex arcuate surface and an inward convex arc section 63 disposed on arcuate component 24, called a shoe which includes a hole for a wrist pin 27 to be inserted. Upper body 21 is mated rigidly to shoe 24. The upper body 21 including the side facing combustion can be made of the same or different material such as soft steel or light aluminum. Not described, but illustrated are locations and workings for floating seals that retain the working gasses in volume 6.

FIG. 5 shows a single contour. The contour upper body 21 has a surface radially outwardly oriented convex arc or spline 61 which when extruded in the A axis direction, forms one of the surfaces of the working volume 6. The shoe 24 has a cylindrical segment face 63 that is convex and oriented radially inward toward shaft 8. Surface 63 has approximately the same or a slightly smaller radius than the concave arc surface 10 in the gearbox 9. Surface 63 includes features, discussed below, which permit a load bearing, sliding surface, provide oil feed and sealing, compensate for thermal expansion and contraction, provide for high load durable wear surface and limit the flow of oil and gases. Surface 63 defines therein a clearance hole in its middle to allow roller supports and connecting rods to pass through it without touching it.

Opposite of surface 63, in shoe 24, is surface 64 which is also a cylinder segment, but facing outward away from main shaft 8, and is concave. Its primary purpose is to contact with the circumference of yoke roller 23.

The parts illustrated in FIGS. 2, 3, 5, and 6 guide the motion of the contour 20. The contour 20's cylindrical surface 63 is in close proximity or touching the cylindrical rollers of linear bearings 22A and 22B. This contact allows the contour assembly 20 to pivot or oscillate in the plane as viewed in FIG. 1 about an imaginary centerline 14. Contour 20's surface 63, center line approximately but not exactly tracks collinear to Gearbox 9's center line 13. Convex surface 63, rolls along the linear bearings 22A, 22B, which are disposed in the concave face 10, of the gearbox 9. This means that the contours 20 can slide back and forth along an arcuate path as defined by the disposition of the linear bearings because the arcuate surfaces 63 of the inwardly facing shoe 24 portion of the contour roll back and forth along the linear bearings, so that the contour oscillates along an arcuate path, the center of which is effectively the center of curvature of the surfaces 10A, 10B, 10C, which coincides with line 13.

FIG. 6 shows the contour 20 held down to the linear bearings 22A and 22B by yoke rollers 23A and 23B. Yoke rollers 23A and 23B are attached to a radially outer end of brackets 25A and 25B. These brackets 25A and 25B are held to the gearbox 9 by fasteners 28A, B at the radially inner end of brackets 25A, 25B. Specifically, these fasteners hold the yoke roller brackets 25A, 25B in place and prevent them from being pulled out of the gearbox 9 along an outward radial direction. Yoke roller brackets 25A, 25B themselves slide along tracks defined within the gearbox 9 that are straight, oriented along the radial (R) direction. Thus, when the radially constrained yoke rollers 23A, 23B roll along their outwardly facing concave tracks 64, within the contour 20, it has the net effect of constraining the motion of the contours to only an arcuate motion and preventing the contours 20 from moving radially outwardly. The fasteners 28 attached to the brackets 25A, 25B that hold the yoke rollers 23A, 23B in place can be adjustable in length (e.g., via a threaded fastener) to achieve a desired tolerance between shoe 24, and the linear bearings 22A, 22B that can roll back and forth along an arcuate direction in an arcuate track defined in the housing. The addition of high spring factor "Belleville" washers 29A, 29B under fastener 28, can allow some small compliance as well as pre-loading force of the yoke roller 23 if desired. While Belleville washers can be used, it will be understood that the disclosed mechanism can be modified to permit other kinds of compression springs can be used, such as compression coil springs.

With reference to FIG. 7, as shaft 8 and gearbox 9 rotate about axis A (in a clockwise direction with respect to FIG. 7), and as contour 20 oscillates back and forth along its own arcuate orbit while in contact with linear bearings 22A and 22B, the radially inwardly facing wall of the center section 1, the inwardly facing surfaces of front and rear side plates 2A and 2B, and the outwardly facing convex surface 61 of the contour body cooperate to define a variable working volume 6, wherein the displacement of the working volume 6 varies as the gearbox 9 rotates with the shaft 8 past and directs each contour along a clockwise direction past the intake port 82, wherein the movement of each contour while moving past the intake port 82 draws in a fuel-air mixture (or just air) and compresses it to either self-ignite (e.g., in the case of a diesel engine), or if a spark ignition, ignite approximately where the contour reaches top dead center. Thus, the rotation of shaft 8 combined with the reciprocating arcuate motion of the contours 20 forms a compound motion. By way of reference, the contour facing the right side of the inwardly facing wall depicted in FIG. 7 is at top dead center. If desired, fuel can be injected via a low pressure fuel injector at the location denoted by reference 86 before the pressure builds up in the working volume. Additionally or alternatively, fuel can be injected via a high pressure fuel injector at location 88, since some volume still exists as defined in the face 63 of the contour at that top dead center location. The working volume then expands and decreases again as the contour 20 passes the exhaust port 84. If spark ignition is provided, a spark plug 90 can be provided at or near top dead center.

Therefore, in continuous operation, the volume of the working volume 6 for each contour 20 increases then decreases in a repetitive fashion twice per revolution, once for intake and once for exhaust. This change in working volume as the shaft 8 and gearbox 9 rotate creates the necessary strokes of the four stroke internal combustion engine, but in a single revolution of the device, unlike the two revolutions required in a traditional piston engine. In so doing, yoke rollers 23 A and 23 B prevent the contour 20 from moving radially outwardly out of contact with the linear bearings thus resisting centripetal forces, and negative pressure forces arising, for example, from creating the working volume when air-fuel mixture is drawn in through the intake port, discussed below.

To create the reciprocating arcuate motion of contour 20 along the linear bearings, each contour 20 has a mating crankshaft assembly 30 of FIG. 2. The crankshaft assembly 30 includes a gear 31, an offset pin 32, a counterweight 33, and two end support bearings 34 A and 34 B that are received by each half of the housing of the gearbox 9. FIG. 2 shows 3 crankshafts assemblies mounted and rotatable within the gearbox 9.

When the gearbox 9 rotates, each crankshaft assembly 30 orbits about axis A within the gearbox. As the crankshaft assemblies orbit, gear 31 of each assembly 30 meshes with stationary gear 7 that, in this case, is bolted to bearing support 3A. The ratios of the two gears in the illustrated implementation are such that each crankshaft assembly rotates two 2 times per revolution of the gearbox 9 about axis A.

FIG. 3 shows contour 20 with a wrist pin 27 that connects a radially outward eye end of connecting rod 26 to the contour 20. Wrist pin 27 allows the connecting rod to pivot and transfer force into the contour assembly. Connecting rod 26 has two eye ends, including the aforementioned radially outward eye end and a radially inward eye end that connects to the offset pin 32 of its respective crankshaft assembly 30. Each eye end of connecting rod 26 is provided with a respective bearing unit within it including plain oil film bearings or ball bearings, needle or roller low friction type bearings. As illustrated, each connecting rod 26 has a first elongate straight portion extending at least partially along a radially inward direction toward the crankshaft assembly 30, and a second straight portion that extends at least partially radially outwardly from the pin 32 of the crankshaft assembly, wherein the two straight portions meet at a bend in the crankshaft in order to achieve an appropriate geometric relationship in order to permit the device to operate.

As mentioned, the radially inward eye end of the connecting rod 26 pivots about crankshaft assembly 30's offset pin 32. As the gearbox 9 rotates about axis A, the gear meshing and speed ratio difference of crankshaft 30 forces, relative to the gearbox 9, an arcuate oscillatory motion of contour 20 along its respective linear bearings. This function is important to prevent the contour assembly 20 (less any floating seals) from directly contacting the inner surface of housing 1.

FIG. 5 shows the detail embodiment of a linear arced roller way 22. Contour 20's shoe part 24, has a hard (e.g., hard steel) polished arced surface 63. Contour top 61 can define therein one or more indentations, grooves, or pockets for seals and space for combustion zones. Shoe 24 includes two convex hard surfaces on which rollers 70 of the linear bearing ride on. As illustrated, cylindrical segment surface 63 contacts rollers 70 of bearing units 22A and 22B. This surface bears most of the combustion process load. Cylindrical segment concave surface 64 contacts yoke rollers 23 A and 23 B that resists upward, centripetal and other opposite loads from surface 63 as discovered above. Surface 63 and 64 are concentric.

Arced segment roller way 22 includes the parts found in the FIG. 5 detail. Typically two or more roller ways 22 can be used to support one contour 20. A multiplicity of individual hard material rollers 70, contact and roll under cylindrical segment surface 63 of contour 20. Rollers 70 that are in contact with surface 63 are supported by inner race 71. Inner race 71 has a mostly cylindrical segment surface which is mostly concentric with the arc surface 63 and imaginary axis, 13 and 14, which the contour rotates about. Inner race 71 is wider than the roller 70 is long so that loads transferred into the inner race can be supported by the two portions of inner race beyond the length of the roller, thus transmitting the load into the gearbox case 9. A void is provided directly under the radially inner race so that unloaded rollers 70 can recirculate to the other end of the roller way. The surface on which the outer race rolls can be removable and rest in the housing, or can be part of a casting or a machining that forms gearbox case 9.

FIG. 6 illustrates the surface 64 of shoe 24 that is in direct contact with yoke rollers 23A and 23B. As mentioned above, each yoke roller 23 is attached to a bracket 25 that is connected to the gearbox 9. Yoke roller 23 and its bracket 25 may or may not have features to allow a small amount of compliance in the radial direction.

The combination of roller way 22, shoe 24 and yoke roller 23 allows controlled rotational movement of the contour 20 about an imaginary axis 13. The FIG. 5 detail shows the rollers 70 carrying the rotating load they traverse an arc segment up to a point where inner race 71 runs out. This will happen at two points, when the contour is rotating clockwise or counter clockwise relative to the gearbox.

When the inner race 71 top arc surface ends, the rollers 70 cease to carry the load and are redirected below inner race 71 by hard material turnaround 73. There are two turnaround devices, one at each end of the roller way. Turnarounds 73 are preferably made from a hard material as scuffing happens as they force the rollers 70 to turn back. Due to mostly centripetal force, rollers 70 contact and follow the underside surface of inner race 71.

Surface 63 of shoe 24 is preferably sufficiently smooth to allow effective use of seal 40 of FIG. 3 to contact against surface 63 thus blocking the transmission of oil and gases out of the gearbox inner workings.

The interior of gearbox 9 is flooded with oil fluid which lubricates the above described parts and absorbs heat from the much hotter radially inwardly facing underside of the contour upper 21. The oil enters the gearbox through bearing support 3A, (FIG. 1, hole 55). Then the oil travels in a passage way within main shaft 8 or through bearing 4A or through bearing support 3A, for example. After splashing around the gears, bearings and connecting rods, centripetal force drives the oil to contact the hot interior of the contour upper 21.

Once oil is trapped in the space under the hot combustion surface of the contour, it is collected by radially outwardly facing pickup pipes 56 (FIG. 3), one per contour. Pipes 56 connect to integral passageways leading to the oil pump, not shown. The oil is forcibly sucked out of the contour and into the opposite end from whence it came from shaft 8. Hot oil goes out with the necessary pressure to filter, cool and recirculate it back to the engine at the other end of main shaft 8.

To prevent oil from leaking out and gases from leaking in around gap 13 of FIG. 1, the underside of the contour 20 has a floating seal 40 illustrated in FIG. 3 contacting the smooth arc surface 63 on the radially inwardly facing underside of shoe 24. Floating seal 40 is illustrated as a rectangular shaped perimeter seal fitted into a perimeter slot 41 (FIG. 2) formed into the gearbox 9. The perimeter seal includes a body having two straight ends connected by arcuate sides that further defines a peripheral channel along an outer edge that is configured to receive a rectangular o-ring (not shown) or other compliant material around the perimeter of the floating seal 40. The o-ring contacts the perimeter slot of the gear box, and the outer surface of the seal forms a light sliding contact with surface 63 of the contour 20, but it will be understood that the majority of the contact force between surface 63 of contour 20 and the gearbox structure occurs between the linear bearings 22 and surface 63, as well as the forces experienced by the connecting rod 26. The outer peripheral arcuate concave surface of floating seal 40 is configured and arranged to act as a sealing surface more so than a bearing surface. The seals 40 and matching slot 41 are dimensioned to minimize leakage over the top and around 40 but still allow movement of the floating seal 40.

Preloading springs under the seal 40 push the seal outward to maintain a nominal seal contact force to contour 20. Seals 40 may be enhanced with rubber or compliant material to improve the blocking of oil or gases under the seal.

As the combustion of fuel creates significant heat, liquid oil cooling passageways (not illustrated) can be incorporated into the gearbox to force hot oil away from the underside of contour upper 21 that are in fluid communication with pipes 56 (FIG. 3). Oil can be forced through the cooling loop by way of a recirculating oil pump (not shown), placed in fluid communication with the oil passageways.

The disclosed embodiments can include a multiplicity of entire engine assemblies as described above attached to one common shaft as a means to increase usable shaft horsepower. Units can be stacked along the axis A and share a common shaft 8 to increase power.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure.

What is claimed is:
1. A rotary machine, comprising:
a) a housing defining an inwardly facing continuously curved surface;
b) front and rear side plates attached to the housing;
c) a central shaft defining a central axis A, the shaft having a first end and a second end;
d) first hub disposed on the central shaft, the first hub having a body with a volume generally defined between front and rear surfaces that are spaced apart along the central shaft, the perimeters of the front and rear surfaces defining at least one radially outwardly facing concavity through the first hub, the first hub being situated axially between the front and rear side plates;
e) at least one bearing race disposed along the radially outwardly facing concavity through the first hub; and
f) at least one contour assembly at least partially slidably disposed on the at least one bearing race disposed along the at least one radially outwardly facing concavity defined on the first hub, the at least one contour assembly being defined at least in part by a convex radially inwardly facing surface and a convex radially outwardly facing surface, the convex radially inwardly facing surface of the at least one contour assembly being configured to slide along the at least one bearing race.

2. The rotary machine of claim 1, wherein the at least one contour assembly is coupled to the first hub by way of a connecting rod, a radially inward end of the connecting rod being pivotally coupled to the hub, and a radially outward end of the connecting rod being pivotally coupled to the at least one contour assembly.

3. The rotary machine of claim 2, wherein the radially inward end of the connecting rod is pivotally coupled to a crank pin.

4. The rotary machine of claim 3, wherein the crank pin is defined on a crankshaft that is distinct from the central shaft, the crankshaft having a center of rotation that is disposed radially outwardly with respect to the central shaft.

5. The rotary machine of claim 4, wherein the crankshaft includes gear teeth that mesh with a central gear that surrounds the central shaft.

6. The rotary machine of claim 5, wherein the central gear is stationary with respect to the housing.

7. The rotary machine of claim 6, wherein the rotary machine is configured to forcibly articulate cyclical motion to cause the at least one contour assembly to circumnavigate through a constrained orbit while maintaining a predetermined spacing between the convex radially outwardly facing surface of the contour assembly and the inwardly facing continuously curved surface of the housing.

* * * * *